June 4, 1968  M. L. STRYDOM  3,386,774
VALVES FOR FEEDING ARTICLES INTO PNEUMATIC CONVEYANCE SYSTEMS
Filed June 13, 1966  3 Sheets-Sheet 1

INVENTOR
MAURITZ L. STRYDOM
BY Young & Thompson
ATTYS.

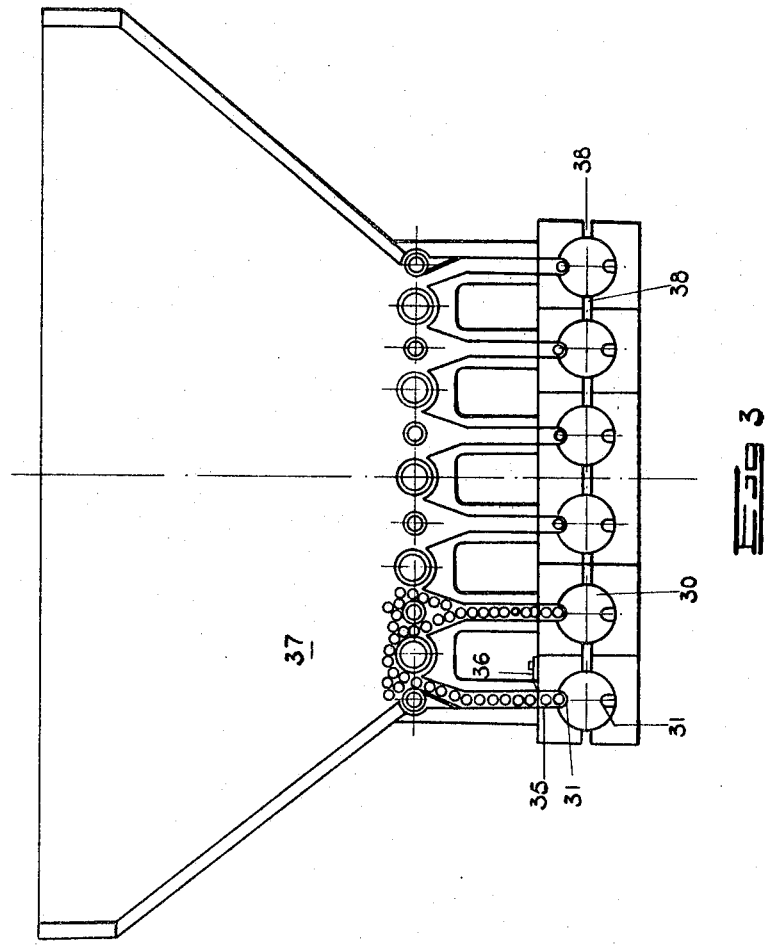

United States Patent Office 3,386,774
Patented June 4, 1968

3,386,774
VALVES FOR FEEDING ARTICLES INTO
PNEUMATIC CONVEYANCE SYSTEMS
Mauritz L. Strydom, Stellenbosch, Cape Province, Republic of South Africa, assignor, by mesne assignments, to Tobacco Research and Development Institute Limited, Zug, Switzerland
Filed June 13, 1966, Ser. No. 556,975
Claims priority, application Republic of South Africa, June 17, 1965, 65/3,196
11 Claims. (Cl. 302—49)

ABSTRACT OF THE DISCLOSURE

A device for feeding rod-shaped articles into pneumatic pipelines having a valve body, preferably a sliding plate, movable between two positions of dwell in the first of which it receives the lowermost of a stack of articles in a specially shaped groove and in the second of which the groove is in register with the pipeline so that the articles are axially propelled along the pipeline.

---

Figure 1:
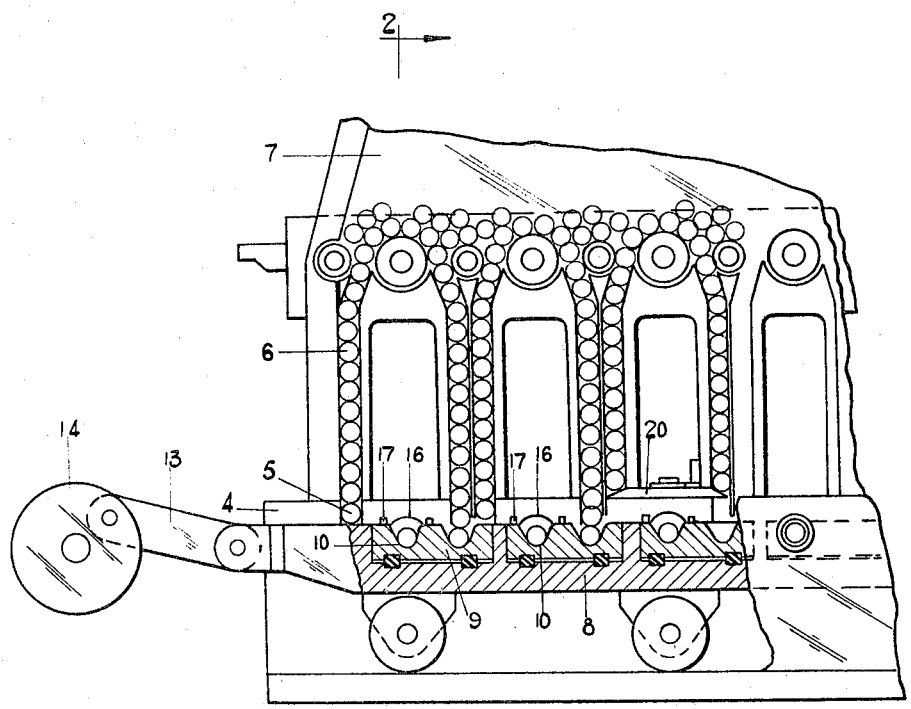

This invention relates to valves for feeding articles into or taking articles out of pneumatic conveying systems.

One problem with which the invention is concerned is to feed a large number of rod-shaped articles, such as filter stubs or cigarettes, into the inlet end of the conveying system at a very fast rate. The desirata are that the articles should be spaced apart in their passage along the conveying pipeline and that the articles should not get damaged in the feeding process.

In this case one is therefore concerned with moving articles singly from a mass to a terminal in alignment with the pneumatic pipeline.

Another problem with which the invention is concerned is to remove articles arriving at a terminal from that terminal without too great a leakage of conveying gas. This second problem usually arises only with suction systems.

According to the invention a valve for a terminal of a pneumatic conveyance system consists in a valve body having a surface curved about an axis, a fixed surface concentric with the valve surface and against which the valve surface is adapted to slide, at a first position a slot through the fixed surface parallel to the axis, a groove in the valve surface parallel to the slot, means to move the valve body so that the slot moves in an arc about the axis between a position of dwell in register with the slot and a second position of dwell, and a terminal in a pneumatic conveyance system axially aligned with the second position of dwell of the groove.

In one form of the invention articles are fed into or out of a system by means of a reciprocating sliding valve driven by means, such as an eccentric mechanism which imparts substantially a sinusoidal movement to the valve, so that in two extreme positions of the valve there is a short period of dwell.

Further according to the invention the sliding valve is provided with at least one receiving groove in its upper surface which underlies a slot filled with a succession of articles to be conveyed or overlies a slot for taking out articles, the groove moving between an extreme position in which it registers with the slot and a second extreme position in which it registers with an escape or terminal into a pipeline and an aligned pneumatic inlet or outlet.

In the preferred form of the invention there are two grooves in respect of each escape or terminal and a slot for each groove. As the valve reciprocates to and fro first one groove is in register with the escape or terminal, while the other is under or over its slot, and next the other is in register with the escape or terminal and the first is under or over its slot. The slots thus straddle the escape or terminal.

The shape of the groove or grooves is critical for each type of article. For rod-shaped articles the depth must not be significantly more than the diameter of the article to be conveyed. However, the width of the groove must be such as to allow dropping of an article into or out of the groove while the valve moves into and out of its short period of dwell. Furthermore that edge of the groove that moves across the mouth of the slot is rounded so that the lowermost article in the stack in the slot is not damaged as the groove moves into or out of position under a slot.

It is a feature of the invention that leakage between the inlet and the slot is prevented by a narrow and shallow flute on that part of the surface of the valve which lies between the receiving groove and the escape or terminal when the former is under or over the slot. The flute is vented to atmosphere.

To ease the escape of articles which may be slightly oversize, the invention provides the cover under which the valve slides be eased with a slight concavity over the region of the escape.

Usually the rate of feed into the system is arranged to be larger than the rate of consumption at the delivery end. Unless the feed can be shut off, the system may get blocked. The invention also provides means for rendering a feed valve inoperative in the sense that it stops feeding articles into a given escape. It should be noted that a single valve can serve several escapes each feeding to a separate delivery position. For this reason and for the reason that a reciprocating motion of the kind in question should not be stopped and started too frequently, the invention provides that escape be prevented simply by blocking the dropping of articles into the grooves serving a particular escape. Such blocking may take place by pushing a slide across the slots at any suitable level corresponding to a position where the articles abut.

The invention further provides that the slide be automatically actuated according to the supply and demand at the delivery end. Thus the slide would be actuated by a level sensor in a surge bin at the delivery end. However, latching and unlatching of the slide, and especially the latter, should take place when the valve is in a favourable position. Thus the sensor signal is blocked and the slide prevented from moving unless the valve is in a favourable position e.g. with a flat surface under a slot. The sensor signal is conveniently applied to the slide actuator, e.g., a solenoid, through a switch on the valve or on the shaft driving the eccentric.

In another form of the invention the valve body is round cylindrical and movable about its axis. The body conveniently has two grooves diametrally opposed and the valve body is moved in steps of half a revolution.

Figure 2:
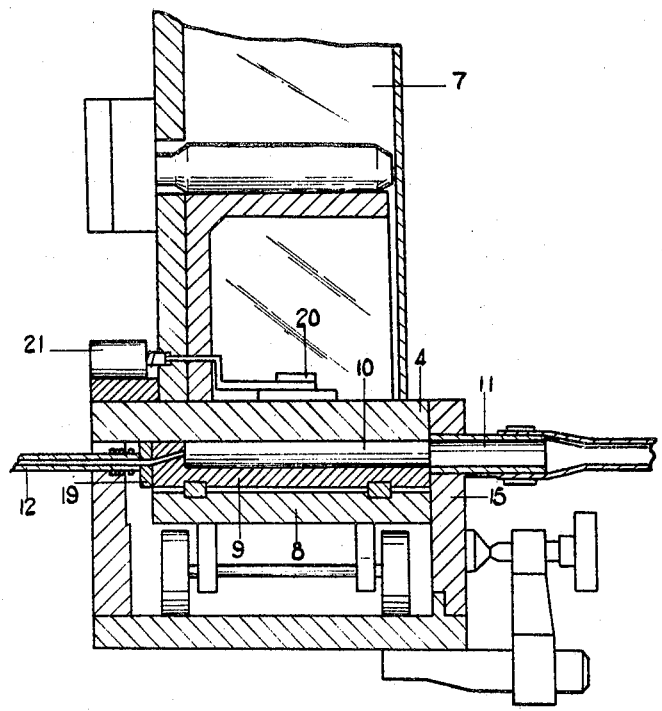

The invention is further discussed with reference to the accompanying drawings, in which FIGURE 1 is a view partly in section through a part of a hopper with a valve according to the invention installed in its base, FIGURE 2 is a section on the line 2—2 of FIGURE 1, and FIGURE 3 is a view similar to FIGURE 1 of another embodiment.

In the embodiment of FIGURES 1 and 2 a hopper adapted to contain filter stubs has a fixed plate 4 in its base. The plate 4 has slots 5 which are extended upwardly by means of slots 6 into the hopper space 7.

Below the plate 4 there is a slide 8 which carries grooved inserts 9. Each insert 9 carries a pair of grooves 10. Between pairs of slots 5 there is a pneumatic conveyance terminal consisting in a pipe 11 for taking away articles to be conveyed. A pipe 12 connected to a source of compressed air feeds a manifold 19 which presses resiliently on the inserts 9. The manifold 19 has holes adapted to register with holes in the slide 8 at the terminals.

The slide 8 is mounted on rollers and is driven by a connecting rod 13 eccentrically connected to a wheel 14 driven by any suitable source of power. A detachable front plate 15 can be removed to service the device.

The slide 8 reciprocates between a position in which one groove 10 is in register with a slot 5 and a position in which the same groove is in register with the terminal. In the latter position another groove 10 carried by the same insert 9 is in register with a slot 5 to the other side of the terminal.

Note that at each terminal the plate 4 is provided with a slight concavity 16 which eases the position at the terminal when the article to be conveyed is slightly oversized.

Furthermore to either side of the terminal the plate 4 has flutes 17 which are vented to atmosphere. This allows for the escape of pressure air which may be trapped in a groove when it moves from a terminal to under a slot 5.

In use each terminal is thus fed from two slots each of which extracts a single article from the stack above each slot.

Usually the rate of feed into the system, i.e. the rate at which articles are dispatched by the valve, is arranged to be larger than the rate of consumption at the delivery end. Unless the feed can be shut off, the system may get blocked. As shown a single valve serves several terminals each of which may lead to a different end point. For this reason and for the reason that a reciprocating motion of the kind in question should not be stopped and started too frequently, dispatch from any one terminal is prevented by blocking the dropping of articles into the grooves serving that terminal. As shown the blocking takes place by means of a pivoted slide 20 operated by a solenoid 21. The slide 20 is of a butterfly shape and upon being actuated it blocks two slots 5 to either side of it.

Clearly the solenoid 21 can be actuated in response to the supply and demand at the delivery end. Thus the slide could be actuated by a level sensor at a surge bin at the delivery end. However, latching and unlatching of the slide 20 should take place when the slide 8 is in a suitable position. This position is when the grooves 10 are out of register with the slots 5. Conveniently the sensor signal is fed to the solenoid 21 through a switch on the slide 8 or a switch on the shaft driving the wheel 14. Thus upon latching or unlatching the valve cannot damage the lowermost article in the slot 5. After latching articles below the slide 20 get dispatched in the normal way. Other terminals continue to be fed as before.

The shape of the grooves 10 is important for efficient operation. The depth must not be significantly more than the diameter of the article to be conveyed. However, the width of the groove must be such as to allow dropping of an article into the groove while the valve moves into and out of its short period of dwell. Furthermore that edge of the groove that moves across the mouth of the slot 5 is rounded so that the lowermost article in the stack above the slot is not damaged as the grooves move in or out of position under the slot. If, say, the filter stubs are normally 8 mm. in diameter, the depth of each groove 10 is about 9 mm. The width is about 10 mm.

In the embodiment of FIGURE 3 there are a series of valve members 30 each provided with a pair of diametrically opposed grooves 31. The hopper space 37 communicates with slots 35. Below each slot 35 there is a terminal similar to the terminal illustrated in the previous embodiment.

Each member 30 is so moved that each groove 31 oscillates between a position under the slot 35 and a position in register with the terminal below the slot. This movement may be achieved in a variety of well known ways. Thus a toothed rack can be reciprocated in a similar manner to the slide in the previous embodiment and the rack can engage with pinions on shafts connected to the members 30. Alternatively an intermittent rotary drive can be used.

In this case blocking of the feed is effected by a slide 36 which need only have a single wing since it does not need to control two slots. Gaps 38 provide for venting to the atmosphere.

Whatever the drive that is used, it is convenient for each member 30 to be so clutched to the drive that it can be declutched without affecting the other members. Thus should a groove become blocked it is not necessary to stop the feed through all the terminals as is the case with the embodiment of FIGURES 1 and 2.

Note that in each case by inverting the system the valve can be used to remove articles from a conveyance system.

The valves of the embodiments have been used with success to convey filter stubs from stub-making machines to cigarette making machines at the rate which is required for modern cigarette manufacture.

I claim:

1. A valve for feeding rod-shaped articles into a pneumatic pipeline consisting in:
    a valve body having a surface curved about a substantially horizontal axis;
    a fixed surface concentric with the valve surface and against which the valve surface is adapted to slide;
    at a first position a substantially vertical slot through the fixed surface parallel to the vertical plane containing the fixed axis, having a mouth adjacent the valve body and being wide enough for the rod-shaped articles to gravitate along it in single file;
    a groove in the valve surface parallel to the mouth of the slot;
    means to move the valve body so that the groove moves in an arc about the axis between a position of dwell in register with the slot and a second position of dwell; and
    an inlet terminal in a pneumatic pipeline axially aligned with the second position of dwell of the groove.

2. The valve claimed in claim 1 including a recess in the fixed surface between the first and second positions of dwell of the groove, the recess being vented to atmosphere.

3. The valve claimed in claim 1 in which the valve body has a flat surface, the axis being at infinity, and in which the means to move the body is means which imparts a substantially sinusoidal reciprocating movement to the body.

4. The valve claimed in claim 3 including a slight concavity in the fixed surface over the second position of dwell of the groove.

5. The valve claimed in claim 3 including a pair of parallel slots through the first surface, and a pair of grooves in the valve surface, each groove having its first position of dwell under one slot and the grooves having a common second position of dwell between the slots.

6. The valve claimed in claim 5 in which the depth of each groove is not significantly more than the diameter of an article to be conveyed, the width of the groove is such as to allow dropping of an article into the groove when the valve body moves into its first position of dwell, and the edge of the groove that moves across the mouth of the slot is rounded so that the lowermost article in the slot is not damaged as the groove moves into and from its position under the slot.

7. The valve claimed in claim 1 in which the valve body is cylindrical and movable about its axis.

8. The valve claimed in claim 7 in which the first and second positions of the groove are diametrically opposed and the valve body is moved in steps of half a revolution.

9. The valve claimed in claim 8 in which the valve body has two diametrically opposed grooves.

10. The valve claimed in claim 1 including blocking means operable to bridge the slot and prevent dropping of articles into the groove.

11. The valve claimed in claim 10 in which the blocking means is arranged to be operable only when the groove is out of register with the slot.

References Cited

UNITED STATES PATENTS

| | | | |
|---|---|---|---|
| 936,951 | 10/1909 | Slichter | 222—276 |
| 3,009,744 | 11/1961 | Lenhart | 302—49 |
| 3,130,879 | 4/1964 | Messing | 302—49 |
| 3,189,178 | 6/1965 | Calleson et al. | 302—2 |
| 3,231,314 | 1/1966 | Cook | 302—49 |
| 3,272,396 | 9/1966 | Neville | 222—276 |

ANDRES H. NIELSEN, *Primary Examiner.*